Oct. 8, 1963  J. M. ALLEN ET AL  3,106,049
PACKAGING MACHINE

Filed Nov. 24, 1961  2 Sheets-Sheet 1

INVENTORS:
JAMES M. ALLEN
BY BERNARD KATZ

Peter P. Tailor
Agent

Oct. 8, 1963  J. M. ALLEN ET AL  3,106,049
PACKAGING MACHINE
Filed Nov. 24, 1961  2 Sheets-Sheet 2
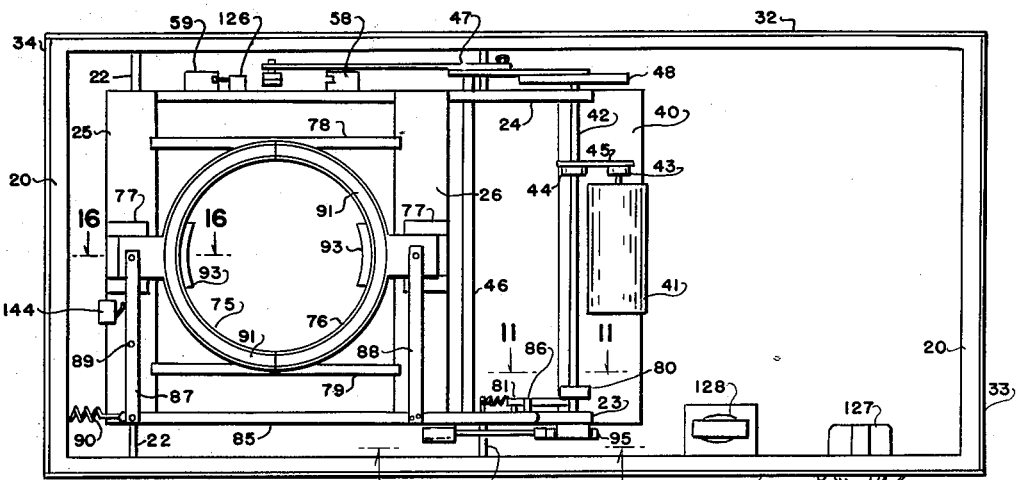
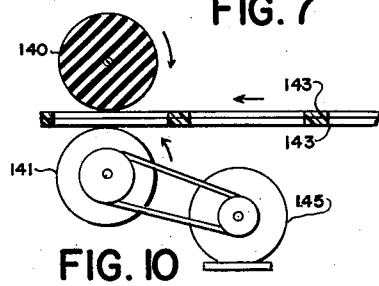
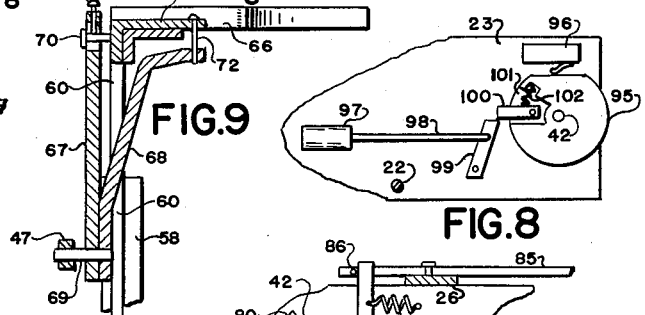
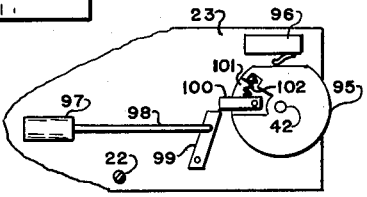
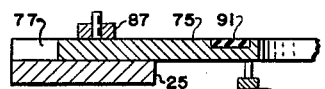
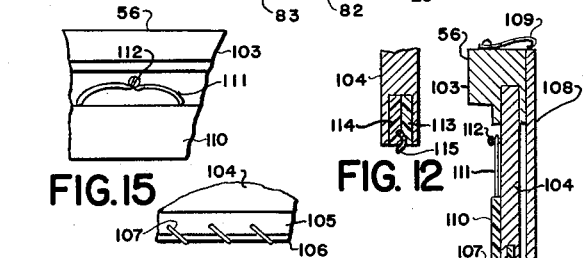
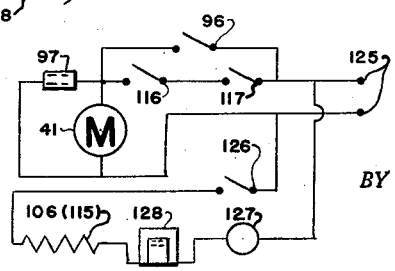
INVENTORS:
JAMES M. ALLEN
BERNARD KATZ
BY
Peter P. Tailer
Agent

United States Patent Office 3,106,049
Patented Oct. 8, 1963

3,106,049
PACKAGING MACHINE
James M. Allen, New York, and Bernard Katz, New Rochelle, N.Y., assignors to Empsco Company, New York, N.Y., a company of New York
Filed Nov. 24, 1961, Ser. No. 154,685
8 Claims. (Cl. 53—177)

This invention relates in general to packaging machines and, more particularly, to a heat sealing machine which seals two layers of a thin plastic film about the entire periphery of an article to be packaged.

Many articles, almost limitless in number, such as round stacks of paper plates, round dishes of candy or nuts, spherical baseballs, heart-shaped boxes of confectionery, and the like may be cheaply, attractively and more protectively packaged between sheets of thin plastic film of polyethylene, vinyl, or the like, which are heat sealed together completely about the article to be packaged with the excess plastic film material trimmed away beyond the seal. Each article which is thus encased somewhat loosely in plastic film, may be subjected to a controlled degree of heat by being moved on a conveyor through an oven. Such an apparatus is known as a shrink tunnel because the heat shrinks the plastic film about the article to be packaged so that the article is neatly and tautly encased in the film without any overlapping of the film material. It is, therefore, an object of this invention to provide a packaging machine which will heat seal two layers of thin plastic film together completely about the periphery of an article to be packaged.

Another object of this invention is to provide a packaging machine which heat seals two layers of thin plastic film together about an article to be packaged, and, at the same time, severs or cuts the encased article from the layers of film wherein the encased article drops beneath the layers of film and is conveyed from the packaging machine.

A further object of this invention is to provide a packaging machine for sealing an article to be packaged between two layers of thin plastic film with the packaging machine having a horizontal work surface, a vertically moving heat sealing head disposed above the work surface over an aperture in the work surface, a platen disposed at least partially within the aperture in said work surface with the heat sealing head sealing the plastic film against the platen and cutting the sealed and encased article from the layers of film, and means at least partially removing the platen from within the aperture in the work surface to allow the sealed article to drop through the aperture in the work surface.

Many other objects, advantages and features of invention reside in the construction, arrangement and combination of parts involved in the embodiment of the invention and its practice as will be understood from the following description and accompanying drawing wherein:

FIGURE 7 is a top view of the packaging machine with the top cover plates, the sealing head and the film racks removed;

FIGURE 8 is a vertical section taken on line 8—8 of FIGURE 7;

FIGURE 9 is a vertical section taken on line 9—9 of FIGURE 4 with the heat sealing ring removed;

FIGURE 10 is a side view of two motor driven film takeup rollers with the film and one roller shown in section;

FIGURE 11 is a vertical section taken on line 11—11 of FIGURE 7;

FIGURE 12 is a transverse section through a portion of the heat sealing ring;

FIGURE 13 is a transverse section through a modification of the heat sealing ring with two spring tensioned pressure rings mounted on the heat sealing ring;

FIGURE 14 is a side view of a fragment of the heat sealing ring of FIGURE 13 with the pressure rings removed;

FIGURE 15 is a side view showing the outer side of the heat sealing ring shown in FIGURE 13;

FIGURE 16 is a section taken on line 16—16 of FIGURE 7;

FIGURE 17 is a bottom view of the elements shown in FIGURE 16;

FIGURE 18 is a vertical section through two layers of film showing an article which had been sealed between the two layers of film and cut from the two layers of film and dropped on conveyor rods beneath the layers of film; and FIGURE 19 is a wiring diagram showing one manner in which the electrical elements of this invention may be connected.

Figure 4:
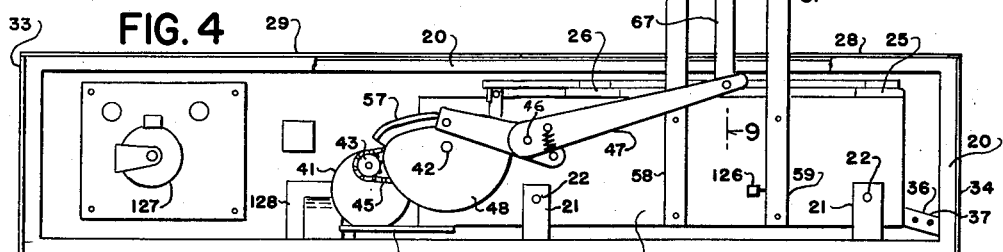
FIGURE 4 is a rear elevation of the packaging machine with the back cover plate removed.

Referring to the drawing in detail, FIGURES 4 and 7 show the angle iron frame 20 of the packaging machine which is welded or otherwise assembled from angle irons in a form which would correspond to the edges of a rectangular solid. Four lugs 21 are welded or otherwise fixed to extend upward from the bottom of the frame 20. Suitable studs or other fasteners 22 extend inward from the lugs 21 and secure the two side plates 23 and 24 within the frame 20. Two heavy cross braces 25 and 26 are bolted or otherwise fixed to the top edges of the side plates 23 and 24 and extend between the side plates 23 and 24.

Figure 1:
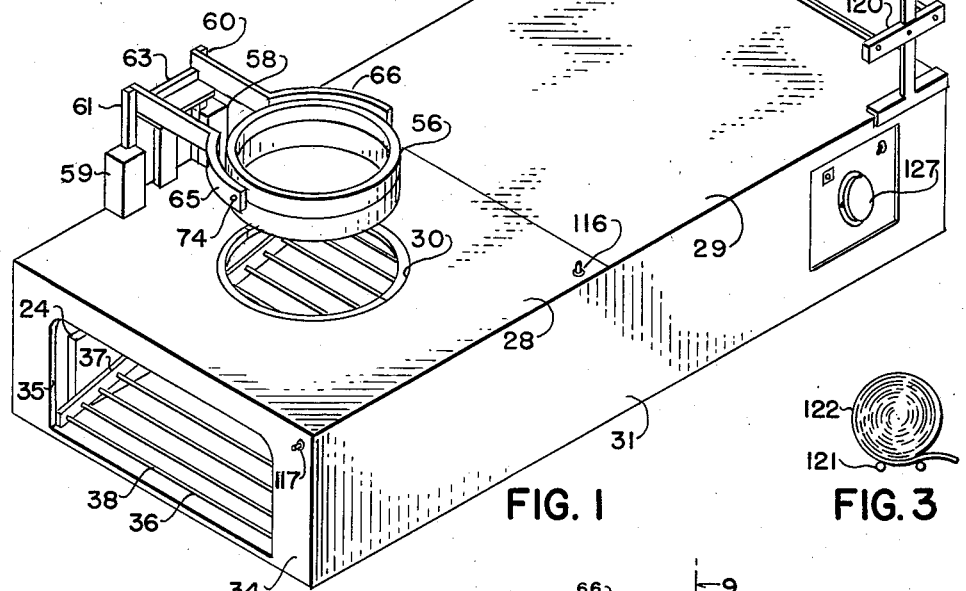
FIGURE 1 is a perspective view of a packaging machine according to this invention with a portion of the film roll rack broken away.

Referring now to FIGURES 1, 4 and 7, two top cover plates 28 and 29 are bolted or otherwise fixed over frame 20. Top cover plate 28 contains a large circular aperture 30. The side cover plates 31 and 32 are fixed over the sides of frame 20 and the end cover plates 33 and 34 are fixed over the ends of frame 20. The end cover plate 34 contains a cutout portion 35.

As may be seen in FIGURE 1, a conveyor 36 is fixed between the side plates 23 and 24 and slopes downward toward the cutout portion 35 in the end cover plate 34. The conveyor 36 extends under the aperture 30 in the top cover plate 28 and it comprises two side members 37 between which there extend the rotatably mounted rods 38. The packaging machine, as shown in FIGURE 7, has the conveyor 36 removed.

As shown in FIGURES 4 and 7, a motor support plate 40 is fixed beneath and extends from the inwardly disposed ends of the side plates 23 and 24. A low speed gear head motor 41 is mounted on plate 40. A shaft 42 is journaled through the side plates 23 and 24. A sprocket 43 is mounted on and rotated by motor 41. Another sprocket 44 is mounted on shaft 42 so that motor 41 may rotate shaft 42 by means of the chain 45 or other suitable drive means. Another shaft 46 extends through the side plates 23 and 24 and has the drive arm 47 mounted on it.

Figures 5, 6:
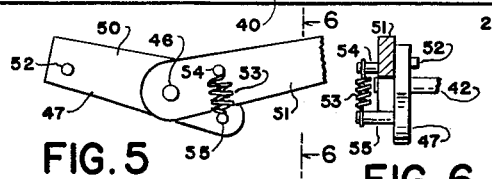
FIGURE 5 is a rear view of the drive arm with a portion broken away.
FIGURE 6 is a section taken on line 6—6 of FIGURE 5.

As shown in FIGURES 4, 5 and 7, a cam 48 is fixed to shaft 42. The drive arm 47 may be formed in one single piece in which case, as a safety measure, the sprocket 43 would incorporate a slip clutch to couple it to the shaft of motor 41. Another safety feature which may be used is shown in detail in FIGURES 5 and 6 in which the drive arm 47 consists of two portions 50 and 51 which are independently mounted to pivot about shaft 46. Portion 50 has mounted at its extreme end the cam follower 52 which engages the cam 48 to raise portion 50 of drive arm 47 as cam 48 rotates. The motion upward of portion 50 is transmitted to portion 51 by means of the tensioned spring 53 which is connected between the pins 54 and 55. Pin 55 is fixed to portion 50 and pin 4 is fixed to portion 51. Therefore, should the mechanism become jammed or catch the hand of an operator, portion 50, upon being urged upward by cam 48, will not urge portion 51 downward but will merely stretch spring 53. Since, as shown in FIGURE 4, the entire weight of the sealing head 56 rests upon the end of arm 47, an outer guide strip 57 may be provided about at least a part of cam 48 to hold drive arm 47 from being rotated in a clockwise direction by the weight of the sealing head 56 when the sealing head 56 is in a raised position.

Referring further to FIGURE 4 and also to FIGURE 9, two guide members 58 and 59 are fixed to side plate 24 and extend above frame 20. The parallel slides 60 and 61 are slidably secured within grooves in guide members 58 and 59. Transverse members 63 extend between the upper portions of the slides 60 and 61. Extending forward from the transverse members 63 and the slides 60 and 61 are the sealing head yokes 65 and 66.

Referring further to FIGURE 9, the extreme end of drive arm 47 engages the links 67 and 68 by means of a suitable pin 69. Link 67 extends vertically upward and is fixed to the rearwardly disposed portion of the transverse members 63 by means of pin 70. A suitable adjustment screw 71 positions pin 70 within an elongated slot in link 67 to effectively adjust its length. Link 68 bends forward and under the forwardly disposed portion of the transverse members 63 and is connected to their forwardly disposed portions by means of the adjustment screw 72. As shown in FIGURES 1 and 4, the sealing head 56 is pivotally supported between the ends of the sealing head yokes 65 and 66 by means of suitable pins 74.

Referring now to FIGURE 7, two substantially identical platen yokes 75 and 76 are slidably secured by the blocks 77 above the cross braces 25 and 26. Two yoke end support members 78 and 79 extend between the cross braces 25 and 26 and slidably support the inwardly disposed ends of the yokes 75 and 76.

Referring now to FIGURE 11, a cam 80 is mounted on shaft 42. An L-shaped member 81 is pivotally supported by pin 82 so that the rotation of cam 80 will strike the pin 83 fixed to member 81 and rotate member 81 counter-clockwise against the pull of a spring 84. This motion causes the upper portion of member 81 to move to the left.

Referring now to both FIGURES 7 and 11, a member 85 is slidably mounted over sideplate 23 above the cross braces 25 and 26. A stud or pin 86 projects inward from member 85 and is engaged by the upper end of member 81. Thus the rotation of member 81 by cam 80 causes the slidably mounted member 85, as shown in FIGURE 7, to move to the right. A projection 88 is rigidly fixed to member 85 and to yoke 76 so that the rightward motion of member 85 causes yokes 76 to be drawn to the right also. A link 87 is pivotally secured about a pin 89 and it is connected to the end of member 85. Thus the motion of member 85 to the right pivots link 87 and withdraws yoke 75 which is attached to link 87. A tension spring 90 urges member 85 to the left as shown in FIGURE 7 to return the yokes 75 and 76 to the position shown as cam 80 completes a revolution.

Referring now to FIGURES 16 and 17, yoke 75, as does yoke 76, contains a semi-circular rubber insert 91. Two rods 92 extend downward near the base of each yoke 75 and 76 and have adjustably and slidably fixed to them the workpiece support members 93. The workpiece support members 93 project within the yokes 75 and 76 and may be vertically positioned along the rods 92 by clamping them in position with one or more thumb screws 94.

Referring now to FIGURES 7 and 8, a disk 95 is fixed on the end of shaft 42. A switch 96 is fixed to side plate 23 above disk 95. One portion of disk 95 is flattened so that, when the flattened portion of disk 95 is engaged by the sensing element of switch 96, switch 96 will be open. When motor 41 is activated, disk 95 rotates counter-clockwise. A solenoid 97 is then energized to withdraw the pivotally mounted stop lever 99 by means of the rod 98. When solenoid 97 is not energized, stop lever 99 is engaged by the outwardly disposed end of the member 100 which is pivotally mounted on disk 95 within a cut-out portion 101. A compression spring 102 urges member 100 counter-clockwise in relation to disk 95.

The circular heat sealing ring 56, as shown in FIGURES 13, 14 and 15, consists of an upper circular member 103 and a lower circular member 104 joined to it. Inserted within a groove in the lower circular member 104 is a circular plastic strip 105. As shown in FIGURE 14, a round heating element or wire 106, of Nicrome or the like, is secured to the lower edge of the strip 105 by means of thin stainless steel wire lashings 107.

Referring further to FIGURES 13 and 15, an inner cylindrical pressure foot 108 extends concentrically within the heat sealing ring 56 and is vertically slidable. The pressure foot 108 extends lower than the heating element 106 and is prevented from dropping downward by any suitable means (not shown) such as a screw passing through an elongated slot in the pressure foot. A spring 109 is fixed to the top of member 103 and it exerts a downward force on the pressure foot 108. A circular plastic outer pressure foot 110 extends about the outer edge of the lower circular portion 104 and is urged downward by two or more bowed leaf springs 111 which are each secured in their center portions by means of a screw 112.

Whatever heating element is used in the sealing head, it will expand longitudinally upon being heated as current flows through it. Thus it is necessary to have the heating element electrically insulated from the sealing head and, at the same time, slidably mounted to allow for such expansion and contraction. A modification of this invention is shown in FIGURE 12 wherein a lower portion 104 of a sealing ring contains a large slot with two circular pieces of high temperature resistant plastic 113 and 114 side by side within it. A flat heating element 115 is used which is first drawn through a dye to give it a channel or a modified U shape. A channel is cut near the bottom edge of the inward facing surface of the outer ring 114. The heating element 115 then hooks into this channel as shown in FIGURE 12 and may slide longitudinally upon expanding and contracting without becoming dislodged. The configuration of element 115 presents a particularly effective cutting and sealing surface.

Figure 2:
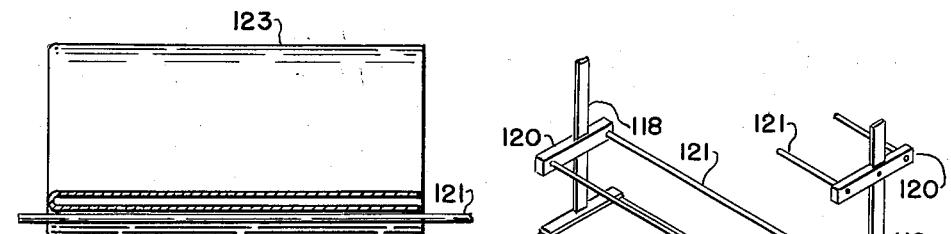
FIGURE 2 is a front view of a roll of center fold film resting on broken away roll support rods.
Figure 3:
FIGURE 3 is an end view of a roll of film resting on roll support rods.

Referring again to FIGURE 1, two vertical members 118 and 119 are fixed to extend upward above the top cover plate 29. Cross members 120 may be adjustably positioned and secured along the lengths of the upright members 118 and 119. Roll support rods 121 are rotatably journaled in pairs between two cross members 120. As shown in FIGURE 3, a roll of 122 of plastic material to be used to packing an article with the packing machine of this invention is supported on a pair of roll support rods 121. If rolls 122 of single thickness material are used, two rolls 122 will be supported one above the other on two pairs of roll support rods 121. If, as shown in FIGURE 2, a roll 123 of center fold plastic material is used, only a single roll of material need be supported on the apparatus.

This invention is used and operates in the following manner. Referring again to FIGURE 1, plastic film is drawn from the roll or rolls supported on the roll support rods 121 and pulled by hand beneath the sealing head 56. An article to be packaged is then placed above the lowermost layer of plastic film and under the uppermost layer of plastic film with the article resting upon the workpiece supporting members 93, as shown in FIGURE 7, which project within the aperture formed by the yokes 75 and 76. The operator then depresses the switches 116 and 117 as shown in FIGURE 1.

Referring now to FIGURE 19, the closing of the switches 116 and 117 activates the solenoid 97 and the motor 41 from a source of line current 125. As motor 41 turns, it rotates shaft 42 so that the flattened portion of disk 95, as shown in FIGURE 8, passes from beneath switch 96. Referring again to FIGURE 19, this closes switch 96 so that solenoid 97 and motor 41 remain activated after the switches 116 and 117 are no longer depressed by the operator. Referring now to FIGURE 4, as shaft 42 rotates, cam 48 moves drive arm 47 to draw the sealing head 56 downward. Sealing head 56 moves downward until the heating element 106 or 115 presses the layers of plastic between itself and the rubber inserts 91 in the yokes 75 and 76. In the lowermost position of the sealing head 56, slide 61 contacts switch 126 and closes it. As shown in FIGURE 19, switch 126, which may be a time switch which closes for a given preset interval, allows line current to flow through the variable transformer 127 and the line transformer 128 through the heating element. Thus the heating element 106 or 115 is activated to seal and cut the layers of plastic and thus encase the article to be packaged. So that the descending heating element 115 or 106 will not first contact and tear the thin plastic film, the inner and outer pressure feet 108 and 110 first contact the layers of plastic film and smooth them against the rubber inserts 91. As the sealing head continues to be forced downward against the rubber inserts 91, the pressure feet 108 and 110 are forced upward against their light spring tension.

Since the sealing head 56 must be held with a moderate force and with perfectly exact alignment against the platen yokes 75 and 76, the sealing head is mounted to pivot longitudinally within the sealing head yokes 65 and 66. Referring now to FIGURE 9, the travel of the arm 47 may be adjusted to draw the sealing head downward and slightly flex the link 68. This action insures positive alignment of the sealing head and the yokes 75 and 76 with the proper sealing and cutting pressure exerted between the sealing head and the yokes.

As shaft 42 continues to rotate, drive arm 47 starts to raise the sealing head 56. At this time, as shown in FIGURE 11, cam 80 activates member 81 to slide member 85 to the left. As shown in FIGURE 7, when member 85 moves to the right, it withdraws the yokes 75 and 76 from beneath the aperture 30 in the top cover plate 28. Since the work support members 93 are withdrawn with the yokes 75 and 76, the article to be encased which was supported on the workpiece supports 93 will drop downward to roll from the packaging machine on the conveyor 36 and out through the cutout 35.

As shaft 42 continues to rotate, as shown in FIGURE 8, the flat portion of disk 95 will again come beneath switch 96 to open switch 96. Referring again to FIGURE 19, the opening of switch 96 deactivates the solenoid 97 and motor 41. As solenoid 97 is deactivated, it drops out and the stop lever 99 moves to the right, as shown in FIGURE 8, so that it is engaged by member 100. As disk 95 continues to rotate as a result of its inertia and the inertia of motor 41, member 100 compresses spring 102 to bring disk 95, shaft 42, and motor 41 to a halt. The operator may then draw additional layers of plastic beneath the sealing head 56, insert another article to be packaged, and again depress the switches 116 and 117 to repeat the sealing cycle.

Referring now to FIGURE 10, should it be desired to automatically draw layers of plastic film beneath the sealing head 56, two rollers 40 and 41 of rubber or other suitably resilient material may be mounted to grip the layers of plastic 143 after they have been sealed about an article and it has been stamped out.

Referring now to FIGURE 7, a switch 144 may be positioned to be activated by the withdrawal of the yokes 75 and 76 as the sealing head 56 raises upwards. This switch 144 could be a time switch which would activate the motor 145 shown in FIGURE 10 to rotate the rollers 140 and 141 for a given short period of time to automatically advance the films 143 for a desired short distance. Should it be desired to adjust the advance of the films 143, the period of time which switch 144 activates motor 145 could be varied, or the ratio of the drive between the motor 145 and the rollers 140 and 141 could be varied.

FIGURE 18 shows a packaged article 148 which has dropped beneath the layers of film 143 to the rods 38 of the conveyor. While the embodiment of the invention shown is adapted to package round or cylindrical objects, the aperture 30 in the top cover plate 28, the yokes 75 and 76, and the sealing head 56 could be modified to package heart-shaped objects and other forms.

While the invention has been disclosed in the best form known, it will nevertheless be understood that this is purely exemplary and that modifications in the construction, arrangement and combination of parts, the substitution of equivalents mechanically and otherwise may be made without departing from the spirit of the invention except as it may be more particularly limited in the appended claims wherein it is claimed:

1. In a packaging machine for sealing articles between two layers of plastic film, a horizontal cover plate containing a large aperture over which two layers of plastic film may be drawn, platen members slidably mounted beneath said cover plate and extending under the aperture in said cover plate, said platen members holding an article to be packaged between two layers of plastic film within the aperture in said cover plate, a peripheral heat sealing head mounted over the aperture in said cover plate, said peripheral sealing head being vertically movable, drive means for said packaging machine, means driven by said drive means lowering said peripheral sealing head to seal and cut the layers of plastic film against said platen members, said peripheral sealing head sealing and cutting said layers of plastic film in a closed curve, said means driven by said drive means raising said peripheral sealing head and at least partially withdrawing said platen members from extending within the aperture in said cover plate to release the article supported by said platen members, and conveyor means beneath said platen members and the aperture in said cover plate conveying sealed articles from said packaging machine.

2. A packaging machine for sealing articles between two layers of plastic film comprising, in combination, a horizontal cover plate containing a large aperture over which two layers of plastic film may be drawn, yoke shaped platen members slidably mounted under said cover plate and extending under the periphery of the aperture in said cover plate, workpiece support members fixed below said platen members and projecting inward from said platen members to support an article to be packaged which is inserted between the two layers of film and extends between said platen members, a peripheral heat sealing head mounted over the aperture in said cover plate and being vertically movable, drive means for said packaging machine, means driven by said drive means lowering said peripheral sealing head to seal and cut the layers of plastic film in a closed curve against said platen members and then raising said sealing head, said means driven by said drive means at least partially withdrawing and then returning said platen members from extending within the aperture in said cover plate after said sealing head starts to be raised, said work piece support members moving outwards with said platen members and releasing the packaged article which drops downward completely through the aperture in said cover plate and between the platen members, and conveyor means beneath said platen members and the aperture in said cover plate conveying sealed articles from said packaging machine.

3. A packaging machine for sealing articles between two layers of plastic film comprising, in combination, a horizontal cover plate containing a large aperture over which two layers of plastic film may be drawn, yoke-shaped platen members slidably mounted under said cover plate and extending under the periphery of the aperture in said cover plate, workpiece support members fixed below said platen members and projecting inward from said platen members to support an article to be packaged which is inserted between the two layers of film and is supported at least partially between said platen members, a vertically slidably mounted yoke having a center portion and two arms extending above the sides of the aperture in said cover plate, a peripheral heat sealing head pivotally mounted between the ends of the arms of said yoke, drive means for said packaging machine, a shaft driven by said drive means, a first cam fixed on said shaft, a pivotally mounted drive arm having a cam follower engaging said cam to pivot said drive arm, a first link extending vertically upward and secured to the back of the center portion of said yoke, a second link extending vertically upward and being bent forward to be attached to the front of the center portion of said yoke, said links being connected to said drive arm and drawing said yoke and thereby said sealing head downward upon the rotation of said shaft by said drive means to seal and cut the layers of plastic film in a closed curve against said platen members and then raise said yoke and said sealing head, a second cam on said shaft, means engaged by said second cam at least partially withdrawing said platen members from extending within the aperture within said cover plate after said sealing head starts upward, said workpiece support members moving outward with said platen members and releasing the packaged article which drops completely through the aperture in said cover plate and between said platen members, spring means returning said platen members to extend under the periphery of the aperture in said cover plate, and conveyor means beneath said platen members and the aperture in said cover plate conveying sealed articles from said packaging machine.

4. The combination according to claim 3 wherein the lower portion of said sealing head contains a groove, and with the addition of an inner ring of insulating material, an outer ring of insulating material, said rings being disposed side by side within the groove in said sealing head, said inner ring containing a longitudinal slot formed in its outer surface near its lower edge, and a channel shaped heating element extending between said inner and outer rings into the slot in said inner ring and extending outward and downward between and beneath said rings and said sealing head.

5. The combination according to claim 4 with the addition of spring mounted pressure foot rings mounted within and without said sealing head and extending below said heating element.

6. The combination according to claim 3 with the addition of roll support means mounted above said cover plate supporting rolls of plastic film material, resilient rollers mounted beyond the aperture in said cover plate with two layers of plastic film from the rolls of film extending between said rollers, drive means rotating said rollers to draw film over the aperture in said cover plate, and means responsive to the outward motion of said platen members activating said drive means rotating said rollers.

7. The combination according to claim 3 wherein said sealing head is circular, said platen members have semi-circular portions extending beneath the aperture in said cover plate, and said platen members each contain a semi-circular channel, and with the addition of resilient material within the channels in said platen members, said sealing head contacting said resilient material.

8. The combination according to claim 3 with the addition of a pair of button switches to be depressed by an operator, a disk having a flattened edge, said disk being mounted on said shaft, a third switch having a sensing element contacting the edge of said disk and being held in a closed position by the edge of said disk, a resiliently mounted projection extending from said disk, a pivotally mounted stop contacting said projection, a solenoid withdrawing said stop from contact with said projection, said pair of switches and said third switch being connected in parallel to said drive means and said solenoid, the flattened edge of said disk opening said third switch dropping out said solenoid to release said stop and engage said projection stopping said disk and said shaft from further rotation.

References Cited in the file of this patent
UNITED STATES PATENTS

| 2,210,509 | Strauch | Aug. 6, 1940 |
| 2,232,783 | Hausheer | Feb. 25, 1941 |
| 2,302,846 | Farmer | Nov. 24, 1942 |
| 2,337,695 | Valentine | Dec. 28, 1943 |
| 2,930,170 | Holsman | Mar. 29, 1960 |